United States Patent
Shi

(10) Patent No.: US 11,256,635 B2
(45) Date of Patent: Feb. 22, 2022

(54) OPTICAL MODULE LINK NEGOTIATION INFORMATION OBTAINING METHOD, DEVICE, AND SYSTEM

(71) Applicant: Huawei Technologies Co., Ltd., Shenzhen (CN)

(72) Inventor: Pin Shi, Chengdu (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 0 days.

(21) Appl. No.: 17/150,635

(22) Filed: Jan. 15, 2021

(65) Prior Publication Data

US 2021/0133127 A1 May 6, 2021

Related U.S. Application Data

(63) Continuation of application No. PCT/CN2018/095831, filed on Jul. 16, 2018.

(51) Int. Cl.
*G06F 13/38* (2006.01)
*G06F 13/16* (2006.01)
*G06F 13/42* (2006.01)

(52) U.S. Cl.
CPC ...... *G06F 13/1668* (2013.01); *G06F 13/4282* (2013.01); *G06F 2213/0016* (2013.01); *G06F 2213/0028* (2013.01)

(58) Field of Classification Search
CPC ............. G06F 13/1618; G06F 13/4282; G06F 2213/0016; G06F 2213/0028
See application file for complete search history.

(56) References Cited

U.S. PATENT DOCUMENTS 3,533,082 A 10/1970 Schnabel et al.
7,558,872 B1 * 7/2009 Senevirathne ...... H04L 47/2458
709/234

(Continued)

FOREIGN PATENT DOCUMENTS

CN 1859155 A 11/2006
CN 1971497 A 5/2007

(Continued)

OTHER PUBLICATIONS

Jiantao, Z., "Research and Implementation of Communication System Based on Fibre Channel," Northwestern Polytechnical University, 2007, with an English abstract, 72 pages.

(Continued)

*Primary Examiner* — Cheng Yuan Tseng
(74) *Attorney, Agent, or Firm* — Conley Rose, P.C.

(57) ABSTRACT

An optical module link negotiation information obtaining method, a device, and a system are provided to include: obtain first information of an optical module readable partition; when the partition indicated by the first information is different from a partition that stores link negotiation information in the optical module, and a recorded quantity of optical module link negotiation information obtaining times does not reach a preset threshold, modify the first information of the optical module readable partition into information indicating the partition that stores the link negotiation information to make the partition that stores the link negotiation information as an updated optical module readable partition; and re-obtain second information of the updated optical module readable partition, and when the updated partition indicated by the second information is the same as the partition that stores the link negotiation information in the optical module, obtain optical module link negotiation information.

20 Claims, 8 Drawing Sheets

(56) References Cited

U.S. PATENT DOCUMENTS

| | | | |
|---|---|---|---|
| 7,600,171 B2* | 10/2009 | Lee | H04L 1/0009 |
| | | | 370/216 |
| 8,218,434 B1* | 7/2012 | Brown | H04L 45/22 |
| | | | 370/227 |
| 9,225,614 B2* | 12/2015 | Koley | H04L 5/0008 |
| 2007/0165660 A1 | 7/2007 | Fang et al. | |
| 2007/0168396 A1 | 7/2007 | Adams et al. | |
| 2010/0228901 A1 | 9/2010 | Tamura et al. | |
| 2013/0219077 A1 | 8/2013 | Ben-Amos et al. | |
| 2021/0133127 A1* | 5/2021 | Shi | G06F 3/0689 |

FOREIGN PATENT DOCUMENTS

| | | |
|---|---|---|
| CN | 102131248 A | 7/2011 |
| CN | 102916776 A | 2/2013 |
| CN | 106708445 A | 5/2017 |
| CN | 107666415 A | 2/2018 |
| GN | 102055521 A | 5/2011 |
| JP | 4432388 B2 | 3/2010 |
| WO | 2010103670 A1 | 9/2010 |

OTHER PUBLICATIONS

Yen, C., "An Efficient PCS to Transmit FEC-coded Frames in Ethernet PON," 2008 International Symposium on High Capacity Optical Networks and Enabling Technologies, 6 pages.

* cited by examiner

OPTICAL MODULE LINK NEGOTIATION INFORMATION OBTAINING METHOD, DEVICE, AND SYSTEM

CROSS-REFERENCE TO RELATED APPLICATIONS

This is a continuation of Int'l patent App. No. PCT/CN2018/095831 filed on Jul. 16, 2018, which is incorporated by reference.

FIELD

The present disclosure relates to the information technology (IT) field, and in particular, to an optical module link negotiation information obtaining method, a device, and a system.

BACKGROUND

Small Computer System Interface (SCSI) is an independent processor standard for a system-level interfaces used between a computer and an intelligent device, including but not limited to a hard disk, a floppy drive, an optical drive, a printer, and a scanner.

A serial-attached SCSI (SAS) uses a serial technology to achieve a higher transmission speed, and is a brand-new type of interface that emerges after a parallel SCSI interface. Compared with a conventional parallel SCSI interface technology, an SAS technology improves performance, availability, and expandability of a storage system, and provides a higher transmission speed, a longer transmission distance, and a better anti-interference capability. The SAS interface is mainly applied to a server, a mass storage system, a disk array, a high-speed interconnect network, and the like.

A mini SAS interface is a new-generation SAS interface, which not only has excellent signal transmission performance, but also can meet a card miniaturization requirement. A mini SAS optical module is an identity of an SAS electrical cable or an SAS optical cable, and is widely applied to enterprise storage and cloud storage.

In a process of obtaining mini SAS optical module link negotiation information, a problem of low reliability exists in obtaining optical module link negotiation information.

SUMMARY

This disclosure provides an optical module link negotiation information obtaining method, a device, and a system, to improve reliability in obtaining optical module link negotiation information.

According to a first aspect, an optical module link negotiation information obtaining method includes: obtaining information of an optical module readable partition; when the partition corresponding to the obtained information of the optical module readable partition is different from a partition that stores link negotiation information and that is in the optical module, and a recorded quantity of optical module link negotiation information obtaining times does not reach a preset threshold, modifying the information of the optical module readable partition into information of the partition that stores the link negotiation information and that is in the optical module; and re-obtaining the information of the optical module readable partition, and when the partition corresponding to the obtained information of the optical module readable partition is the same as the partition that stores the link negotiation information and that is in the optical module, obtaining the optical module link negotiation information.

In the foregoing method, the information of the readable partition is obtained first, and when the partition corresponding to the obtained information of the readable partition is different from the partition that stores the link negotiation information and that is in the optical module, and the recorded quantity of optical module link negotiation information obtaining times does not reach the preset threshold, the information of the optical module readable partition is modified into the information of the partition that stores the link negotiation information and that is in the optical module, to obtain the optical module link negotiation information. This can avoid a situation in which information of an optical module readable partition is first modified into information of a partition that stores link negotiation information and that is in the optical module, and consequently the obtaining fails because transient power interruption, abnormal link reset, or another case occurs during a period after the modification and before reading. Therefore, reliability of reading the optical module link negotiation information is improved.

In the foregoing method, when the partition corresponding to the obtained information of the optical module readable partition is the same as the partition that stores the link negotiation information and that is in the optical module, it indicates that the partition that stores the link negotiation information and that is in the optical module is selected. In other words, the information of the partition that stores the link negotiation information and that is in the optical module can be read. In this case, a success rate and reliability in obtaining the optical module link negotiation information are both high.

Optionally, in the foregoing method, the modifying the information of the optical module readable partition into the information of the partition that stores the link negotiation information and that is in the optical module may be implemented by modifying a value corresponding to a field used for recording a selected partition of the optical module into a value corresponding to the information of the partition that stores the link negotiation information and that is in the optical module. Optionally, the selected partition of the optical module is a partition whose stored content can be read.

In a possible implementation, before the re-obtaining the information of the optical module readable partition, the method further includes: adding 1 to the recorded quantity of optical module link negotiation information obtaining times.

In a possible implementation, after the re-obtaining the information of the optical module readable partition, the method further includes: when the partition corresponding to the obtained information of the optical module readable partition is different from the partition that stores the link negotiation information and that is in the optical module, and the recorded quantity of optical module link negotiation information obtaining times does not reach the preset threshold, re-modifying the information of the optical module readable partition into the information of the partition that stores the link negotiation information and that is in the optical module, re-obtaining the information of the optical module readable partition, and adding 1 again to the recorded quantity of optical module link negotiation information obtaining times.

In a possible implementation, the optical module link negotiation information is used for link negotiation in a driving and management process of the optical module; and the optical module link negotiation information includes: a connector type, a photoelectric parameter, multi-mode or single-mode indication information, a voltage, and a transmit offset.

Optionally, the optical module link negotiation information further includes an operating temperature, vendor information, or the like.

Optionally, the method is implemented by a microcontroller unit (MCU). The MCU is connected to the optical module by using an Inter-Integrated Circuit ($I^2C$) bus.

Optionally, the MCU is an MCU in a control device of a storage system, or the MCU is an MCU in a storage device of a storage system.

Optionally, the optical module is a mini SAS optical module. The partition that stores the link negotiation information is a page 0 partition in the mini SAS optical module.

Optionally, the information of the optical module readable partition is information of the selected partition of the optical module. For example, when the optical module selects the page 0 partition, the MCU can read information of the page 0 partition through a connection between the MCU and the optical module.

Optionally, the preset threshold is 3. Optionally, the preset threshold of the recorded quantity of optical module link negotiation information obtaining times may be a first preset threshold.

Optionally, the adding 1 to the recorded quantity of optical module link negotiation information obtaining times is implemented by adding 1 to a counter in the MCU, for example, may be implemented by adding 1 to a first counter.

In a possible implementation, the method further includes: obtaining the information of the optical module readable partition by obtaining content corresponding to a page select byte control byte of the optical module, where the page select byte control byte records information about a selected partition. For example, when the content corresponding to the page select byte control byte of the optical module is 0, it indicates that the selected partition is the page 0 partition.

Optionally, the page select byte control byte is the 127th byte in a common memory map.

In a possible implementation, the method further includes: terminating obtaining the optical module link negotiation information when the partition corresponding to the obtained information of the optical module readable partition is different from the partition that stores the link negotiation information and that is in the optical module, and the recorded quantity of optical module link negotiation information obtaining times reaches the preset threshold.

When the partition corresponding to the obtained information of the optical module readable partition is different from the partition that stores the link negotiation information and that is in the optical module, and the recorded quantity of optical module link negotiation information obtaining times reaches the preset threshold, obtaining the optical module link negotiation information is terminated. The terminating obtaining the optical module link negotiation information may be implemented by exiting the driving and management process of the optical module. In this way, an effective processing mechanism is still provided for an optical module that does not support a write operation on a partition selection field, for example, an optical module that does not support writing a page select byte. Therefore, compatibility in reading the optical module link negotiation information is improved.

In a possible implementation, the method further includes: when the information of the optical module readable partition fails to be obtained, and the recorded quantity of optical module link negotiation information obtaining times does not reach the preset threshold, re-obtaining the information of the optical module readable partition, and adding 1 to the recorded quantity of optical module link negotiation information obtaining times. Optionally, when the information of the optical module readable partition fails to be obtained, 1 is added to the recorded quantity of optical module link negotiation information obtaining times by adding 1 to the first counter. In other words, when the information of the optical module readable partition fails to be obtained, the quantity of optical module link negotiation information obtaining times can be recorded by using only the first counter.

In a possible implementation, the method further includes: when the information of the optical module readable partition fails to be obtained, re-obtaining the information of the optical module readable partition.

Optionally, a quantity of failures in obtaining the information of the optical module readable partition may be counted by using another counter. When the quantity of failures in obtaining the information of the optical module readable partition reaches another preset threshold, for example, a second preset threshold, information about a failure in obtaining the information of the optical module readable partition is sent. Optionally, the quantity of failures in obtaining the information of the optical module readable partition may be counted by using a second counter in the MCU. When the information of the optical module readable partition fails to be obtained, 1 is added to the second counter. In other words, the counter used for recording the quantity of failures in obtaining the information of the optical module readable partition may be different from a counter used for recording the quantity of optical module link negotiation information obtaining times.

According to a second aspect, a control chip includes a control unit and an obtaining unit, where the obtaining unit is configured to obtain information of an optical module readable partition; the control unit is configured to: when the partition corresponding to the information of the optical module readable partition that is obtained by the obtaining unit is different from a partition that stores link negotiation information and that is in the optical module, and a recorded quantity of optical module link negotiation information obtaining times does not reach a preset threshold, modify the information of the optical module readable partition into information of the partition that stores the link negotiation information and that is in the optical module; and the obtaining unit is further configured to re-obtain the information of the optical module readable partition, and when the partition corresponding to the obtained information of the optical module readable partition is the same as the partition that stores the link negotiation information and that is in the optical module, obtain the optical module link negotiation information.

In the foregoing control chip, the obtaining unit obtains the information of the optical module readable partition. When the partition corresponding to the information of the optical module readable partition that is obtained by the obtaining unit is different from the partition that stores the link negotiation information and that is in the optical module, and the recorded quantity of optical module link negotiation information obtaining times does not reach the preset threshold, the control unit modifies the information of the optical module readable partition into the information of the partition that stores the link negotiation information and that is in the optical module, to obtain the optical module link negotiation information. This can avoid a situation in which the control chip fails to read the optical module link negotiation information due to transient power interruption, abnormal link reset, or another case. Therefore, reliability of reading the optical module link negotiation information is improved.

Optionally, modifying, by the control unit, the information of the optical module readable partition into the information of the partition that stores the link negotiation information and that is in the optical module may be implemented by the control unit by modifying a value corresponding to a field used for recording a selected partition of the optical module into a value corresponding to the information of the partition that stores the link negotiation information and that is in the optical module. Optionally, the selected partition of the optical module is a partition whose stored content can be read.

Optionally, the control chip is a control chip in a control device of a storage system, or the control chip is a control chip in a storage device of a storage system.

Optionally, the optical module is a mini SAS optical module. The partition that stores the link negotiation information is a page 0 partition in the mini SAS optical module.

Optionally, the information of the optical module readable partition is information of the selected partition of the optical module. For example, when the control chip is an MCU and the optical module is a mini SAS optical module, when the optical module selects the page 0 partition, the MCU can read information of the page 0 partition through a connection between the MCU and the optical module. Optionally, the preset threshold is 3. Optionally, the preset threshold of the recorded quantity of optical module link negotiation information obtaining times may be a first preset threshold.

In a possible implementation, the optical module link negotiation information is used for link negotiation in a driving and management process of the optical module; and the optical module link negotiation information includes: a connector type, a photoelectric parameter, multi-mode or single-mode indication information, a voltage, and a transmit offset.

Optionally, the optical module link negotiation information further includes an operating temperature, vendor information, or the like.

In a possible implementation, the control chip further includes a counting unit, where the counting unit is configured to add 1 to the recorded quantity of optical module information obtaining times after the information of the optical module readable partition is modified into the information of the partition that stores the link negotiation information and that is in the optical module.

In a possible implementation, the counting unit is further configured to add 1 to the recorded quantity of optical module link negotiation information obtaining times when the information of the optical module readable partition fails to be obtained and the recorded quantity of optical module link negotiation information obtaining times does not reach the preset threshold.

Optionally, the foregoing counting unit may be a counter in the control chip.

In a possible implementation, the obtaining unit is further configured to terminate obtaining the optical module link negotiation information when the partition corresponding to the information of the optical module readable partition that is obtained by the obtaining unit is different from the partition that stores the link negotiation information and that is in the optical module, and the recorded quantity of optical module link negotiation information obtaining times reaches the preset threshold.

When the partition corresponding to the obtained information of the optical module readable partition is different from the partition that stores the link negotiation information and that is in the optical module, and the recorded quantity of optical module link negotiation information obtaining times reaches the preset threshold, the obtaining unit in the control chip terminates obtaining the optical module link negotiation information. For example, the control chip may exit the driving and management process of the optical module, so that the obtaining unit terminates obtaining the optical module link negotiation information. In this way, the control chip can perform effective processing for an optical module that does not support a write operation on a partition selection field, for example, an optical module that does not support writing a page select byte. Therefore, compatibility in reading the optical module link negotiation information is improved.

In a possible implementation, the obtaining unit is further configured to: when the information of the optical module readable partition fails to be obtained, re-obtain the information of the optical module readable partition.

Optionally, a quantity of failures in obtaining the information of the optical module readable partition may be counted by using another counting unit in the control chip. When a count of the another counting unit reaches another preset threshold, for example, a second preset threshold, the control chip sends information about a failure in obtaining the information of the optical module readable partition.

Optionally, the foregoing another counting unit may be another counter in the control chip.

In a possible implementation, the obtaining unit obtains the information of the optical module readable partition by obtaining content corresponding to a page select byte control byte of the optical module, where the page select byte control byte records information about a selected partition. For example, when the content corresponding to the page select byte control byte of the optical module is 0, it indicates that the selected partition is the page 0 partition.

Optionally, the page select byte control byte is the 127th byte in a common memory map.

In a possible implementation, the obtaining unit is further configured to: when the information of the optical module readable partition fails to be obtained and the recorded quantity of optical module link negotiation information obtaining times does not reach the preset threshold, re-obtain the information of the optical module readable partition.

According to a third aspect, a control device includes a central processing unit, a main memory, and the control chip according to the second aspect.

According to a fourth aspect, a storage device includes a storage medium and the control chip according to the second aspect.

According to a fifth aspect, a storage system includes a control device and a storage device, where the control device includes a central processing unit, a main memory, and the control chip according to the second aspect; and the storage device includes a storage medium and the control chip according to the second aspect.

According to a sixth aspect, a computer storage medium is configured to store a computer software instruction used by a control chip, and the computer software instruction includes a program designed for performing the methods in first aspect.

According to a seventh aspect, when a control chip in a computer device or a server runs a computer program, the control chip performs a function of the control chip according to the second aspect.

BRIEF DESCRIPTION OF THE DRAWINGS

To describe the technical solutions in the embodiments more clearly, the following briefly introduces the accompanying drawings for describing the embodiments. The accompanying drawings in the following description show merely some embodiments of the present disclosure, and a person of ordinary skill in the art may still derive other drawings from these accompanying drawings without creative efforts.

DETAILED DESCRIPTION

The following describes the embodiments of the present disclosure with reference to the accompanying drawings.

The terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features.

Figure 1A:
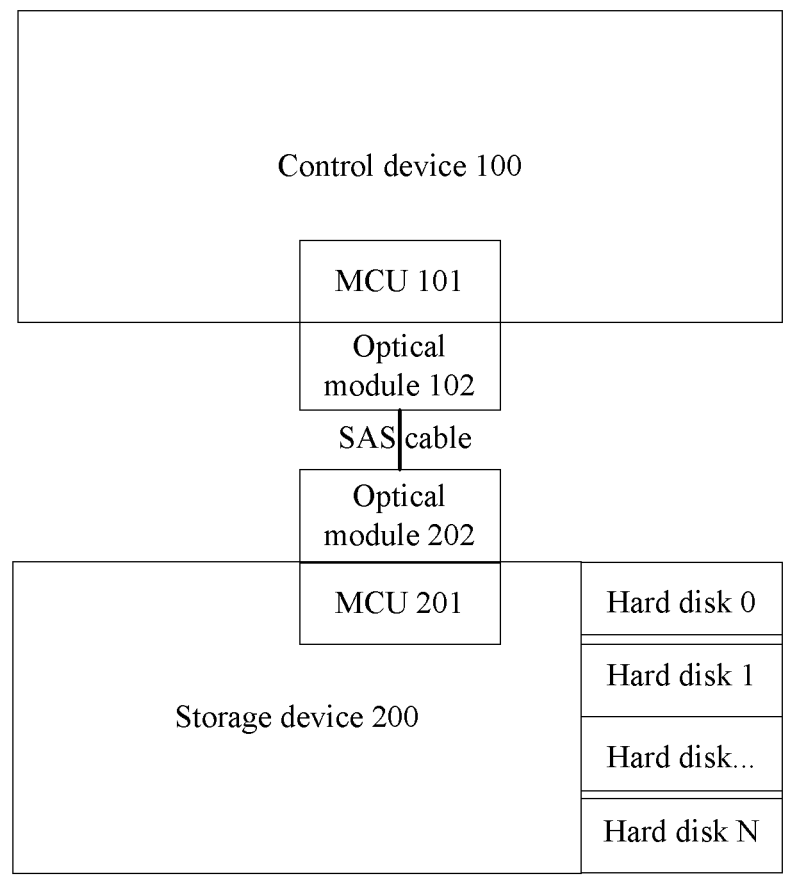
FIG. 1A is a schematic structural diagram of a storage system according to an embodiment.

FIG. 1A is a schematic structural diagram of a storage system, including a control device 100 and a storage device 200. The control device 100 mainly includes hardware resources such as a central processing unit (CPU), a main memory (for example, a random-access memory (RAM)), and an MCU. In FIG. 1A, an example in which only an MCU 101 is illustrated is used for description. The storage device 200 is configured to store data, and may include but is not limited to storage media such as a hard disk drive (HDD) and a solid-state drive (SSD). In FIG. 1A, an example in which the storage device 200 includes a hard disk is used for description. The control device 100 is connected to an optical module 102, the storage device 200 is connected to an optical module 202, and the optical module 102 and the optical module 202 are connected by using an SAS cable, thereby implementing communication between the control device 100 and the storage device 200.

After the optical module 102 accesses the control device 100, the MCU 101 in the control device 100 can detect access of the optical module and start a driving and management process, to establish a connection to the optical module 102. The MCU 101 is a chip with a management and control function and performs different combined control for different scenarios. For example, the MCU 101 may be a chip-level computer formed by appropriately reducing a frequency and a specification of a CPU, and integrating, to a single chip, a main memory, a timer, a counter, a Universal Serial Bus (USB), an analog/digital (A/D) converter, a universal asynchronous receiver/transmitter (UART), a programmable logic controller (PLC), peripheral interfaces such as a direct memory access (DMA) interface, and even a driving circuit of a light coupled device (LCD).

The MCU 101 can communicate with the optical module 102 by using an I²C bus. In other words, the MCU 101 can obtain information inside the optical module 102 by using the I²C bus. The I²C bus is a common bus for obtaining the optical module link negotiation information, because the I²C bus has a clear structure, including one data line and one clock line, and has a simple implementation principle. However, a form of a communications bus between the MCU 101 and the optical module 102 is not limited, and another bus that enables the MCU 101 to obtain the information inside the optical module 102 can also be implemented by using the technical solutions provided. An I²C bus is used as an example for description.

Similarly, after detecting that the optical module 202 accesses the storage device 200, an MCU 201 starts a driving and management process by using the I²C bus and establishes a connection to the optical module 202.

FIG. 1A depicts by using one control device and one storage device as an example. It should be understood that the control device 100 may also be connected to a plurality of storage devices in specific implementation. When the control device is connected to a plurality of storage devices, an implementation in which each control device is connected to the storage devices by using optical modules is similar to the implementation in which the control device 100 is connected to the storage device 200. Details are not described again.

Figure 1B:
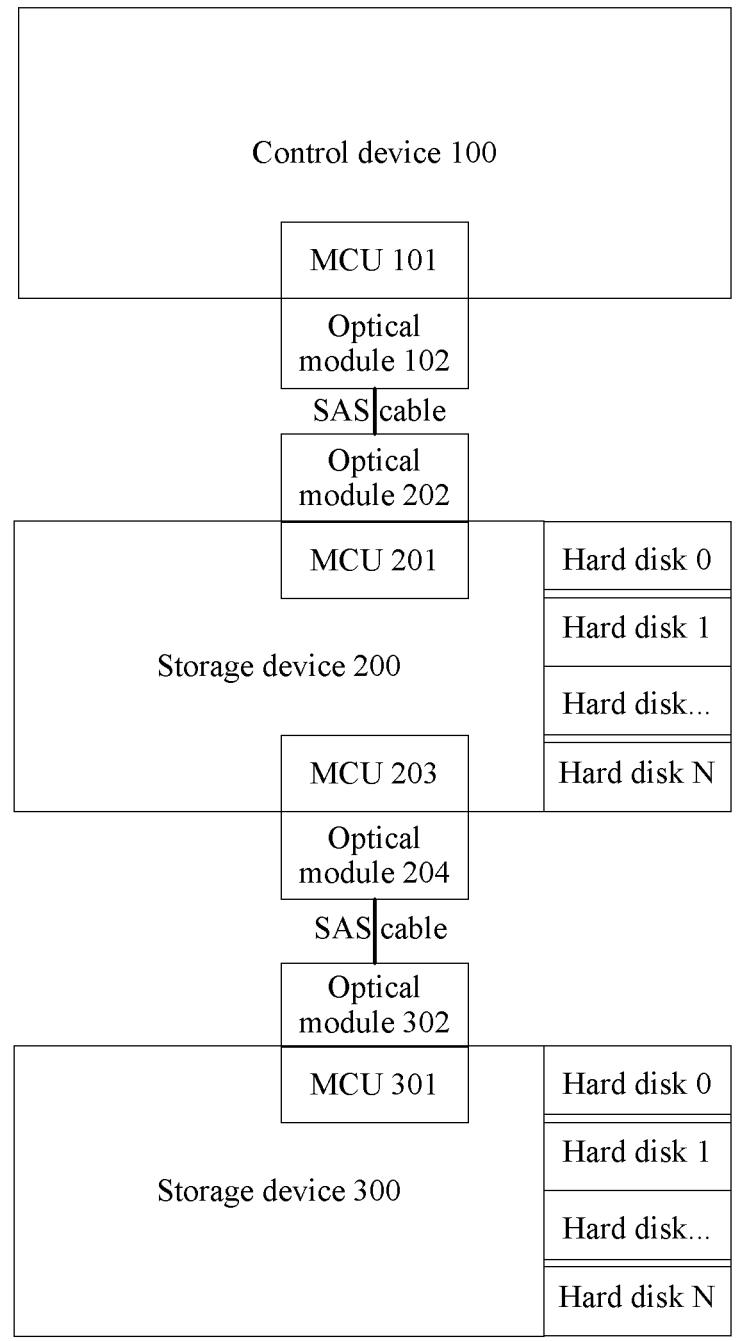
FIG. 1B is another schematic structural diagram of a storage system according to an embodiment.

FIG. 1B is a schematic structural diagram of implementation of a storage system in another scenario. In FIG. 1B, the storage device 200 is further connected to a storage device 300 by using an SAS cable. In other words, the storage device 200 is connected to the storage device 300 by using an optical module 204, the SAS cable, and an optical module 302. A connection relationship between an MCU 301 and the optical module 302 in the storage device 300 is similar to a connection relationship between an MCU 203 and the optical module 204 in the storage device 200. Details are not described again.

It can be understood that the foregoing SAS channel is merely an example. In specific implementation, the control device may alternatively be connected to the storage device by using a Peripheral Component Interconnect Express (PCIe) channel or an Ethernet channel. This embodiment is described by using the SAS channel as an example, but the technical solutions are not limited to an implementation of the SAS channel, and another implementation such as the PCIe channel or the Ethernet channel may also be implemented with reference to the implementation of the SAS channel. Details are not described again.

In the communications systems shown in FIG. 1A and FIG. 1B, stability of the communication between the control device 100 and the storage device 200 and stability of communication between the storage device 200 and the storage device 300 determine performance and stability of the storage systems. The stability of the communication between the control device 100 and the storage device 200 depends on stability of communication, performed by using the SAS cable, between the optical module 102 and the optical module 202. The stability of the communication between the storage device 200 and the storage device 300 depends on stability of communication, performed by using the SAS cable, between the optical module 204 and the optical module 302.

In factors that affect stability of a high-speed SAS communications channel, obtaining optical module link negotiation information by the MCU to perform link negotiation is a key factor. When the MCU fails to obtain the optical module link negotiation information, the link negotiation is affected, and stability of an SAS channel is affected ultimately.

After detecting the access of the optical module, the MCU starts the driving and management process of the optical module. In the driving and management process of the optical module, the MCU obtains the optical module link negotiation information. For example, during driving and management of the optical module 102, the MCU 101 obtains link negotiation-related information inside the optical module 102 to perform link negotiation. During driving and management of the optical module 202, the MCU 201 obtains link negotiation-related information inside the optical module 202 to perform link negotiation.

In an example of a mini SAS optical module, the optical module stores information of four partitions (page 0 to page 3). Information used for link negotiation is stored in a page 0 partition, and a page 1 partition to the page 3 partition are mainly information spreading parts, and store an application code, a user-defined interval, and the like. In specific implementation, the MCU can read/write a page select byte field by using an $I^2C$ protocol, and select a page partition and read information of the partition.

Figure 2:
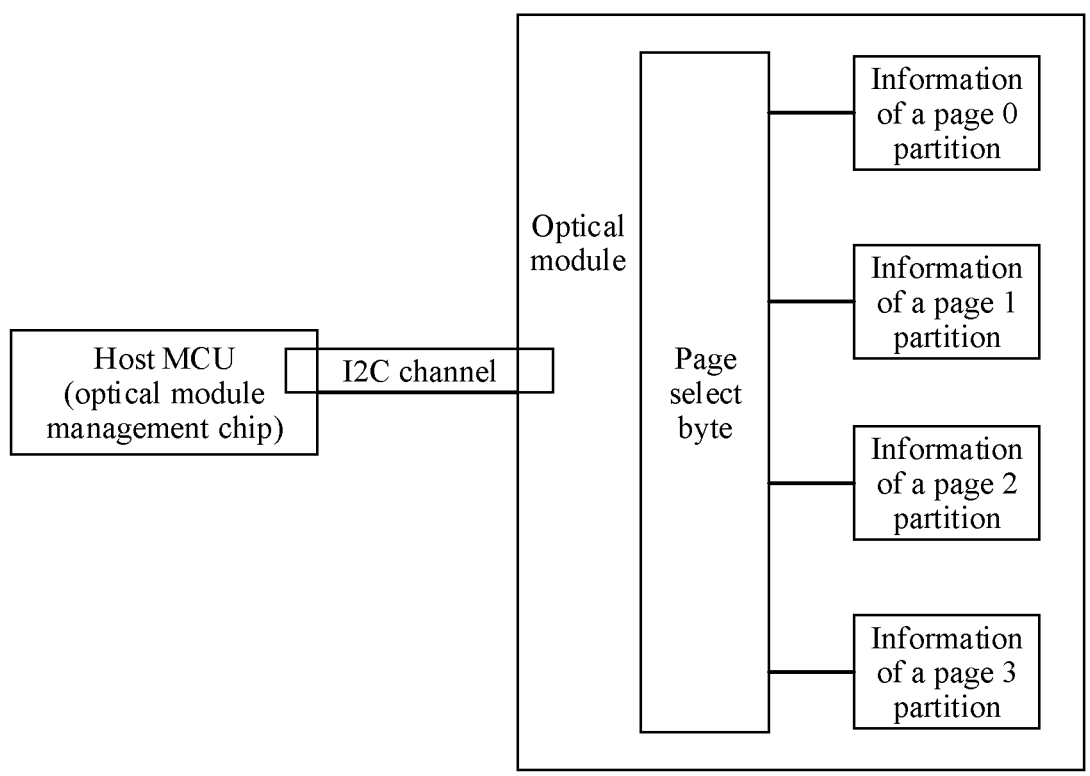
FIG. 2 is a schematic structural diagram of a connection of an MCU to a mini SAS optical module by using an I²C bus according to an embodiment.

With reference to FIG. 2, FIG. 2 is a schematic structural diagram of a connection of an MCU to a mini SAS optical module by using an $I^2C$ bus and information of partitions inside the optical module. It can be understood that the MCU may alternatively be connected to the optical module by using another bus, provided that the optical module link negotiation information can be obtained. The another bus also falls within the scope disclosed in the embodiments.

The driving and management performed by the MCU on the mini SAS optical module includes but is not limited to: optical module in-service inspection, optical module information obtaining, out-of-band parameter configuration based on the obtained information, and SAS link rate negotiation enabling.

The optical module in-service inspection is mainly monitoring whether the optical module accesses a system.

The optical module information obtaining is mainly obtaining optical module link negotiation information that is generally information of the page 0 partition. The optical module link negotiation information includes but is not limited to information such as a connector type, information indicating an optical cable or an electrical cable, a photo-electric parameter, multi-mode or single-mode indication information, a voltage, and a transmit offset. The optical module link negotiation information may further include information such as an operating temperature or a vendor.

The out-of-band parameter configuration is mainly configuring link parameters such as pre-emphasis, a swing, and a center parameter based on the obtained information inside the optical module.

The SAS link rate negotiation enabling is mainly enabling SAS link rate negotiation.

In the foregoing four driving and management items, obtaining of the optical module link negotiation information is a core part of the overall driving and management and is directly related to stability of a link.

Figure 3:
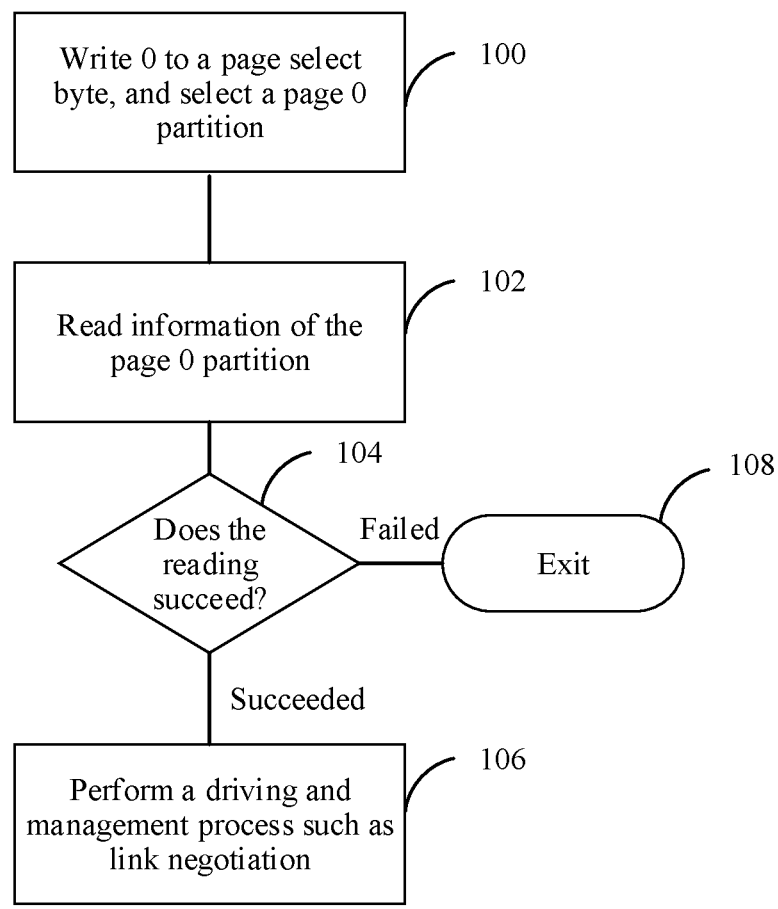
FIG. 3 is a schematic flowchart of obtaining optical module link negotiation information by an MCU according to an embodiment.

FIG. 3 is a schematic flowchart of obtaining optical module link negotiation information by an MCU based on the scenario shown in FIG. 2. As shown in FIG. 3, the following steps are included.

Step 100: After detecting access of a mini SAS optical module, the MCU first sets a page select byte to 0 and selects a page 0 partition.

When the MCU sets the page select byte to 0, the page 0 partition is selected. The MCU may obtain the information of the page 0 partition after selecting the page 0 partition.

Step 102: The MCU reads information of the page 0 partition.

Step 104: Determine whether the information of the page 0 partition is successfully read, and when the information of the page 0 partition is successfully read, perform step 106, when the information of the page 0 partition fails to be read, perform step 108.

Step 106: When the information of the page 0 partition is successfully read, perform a subsequent driving and management process, for example, link negotiation, based on the obtained information of the page 0 partition.

Step 108: When the information of the page 0 partition fails to be read, exit the driving and management process.

In the foregoing step 102, the MCU attempts to obtain the information of the page 0 partition only once without a confirmation mechanism, resulting in low reliability in obtaining the information of the page 0 partition. Moreover, in some scenarios, such as scenarios with transient power interruption and abnormal reset of a master $I^2C$ bus, a factor causing first access of the $I^2C$ bus unstable exists, and information obtaining may be abnormal or a parameter in another partition may be read, resulting in a parameter configuration failure and a link negotiation failure.

In addition, driver access interfaces of optical modules produced by some vendors do not comply with the following management protocol: SFF-8636 Specification for Common Management Interface, and do not support an operation of writing the page select byte. When these optical modules access a control device or a storage device, information in the optical modules cannot be read during the driving and management process, and there is no effective processing mechanism. "SFF" stands for small form factor and is mainly used to define a standard for some connectors in a storage system.

An embodiment provides an optical module link negotiation information obtaining method, to resolve a problem of low reliability in obtaining optical module link negotiation information.

Figure 4A:
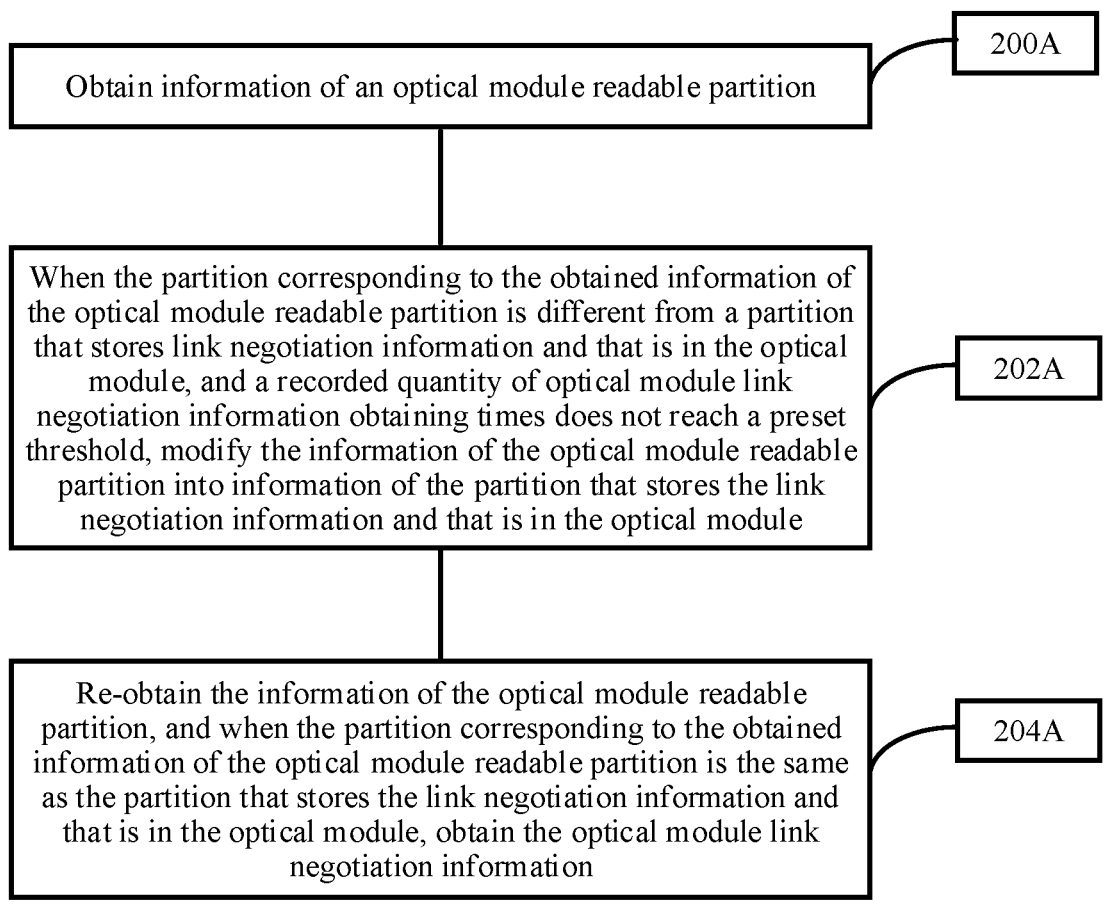
FIG. 4A is a schematic flowchart of an optical module link negotiation information obtaining method according to an embodiment.

FIG. 4A is a schematic flowchart of an optical module link negotiation information obtaining method according to an embodiment. The method includes the following steps:

Step 200A: Obtain information of an optical module readable partition.

Step 202A: When the partition corresponding to the obtained information of the optical module readable partition is different from a partition that stores link negotiation information and that is in the optical module, and a recorded quantity of optical module link negotiation information obtaining times does not reach a preset threshold, modify the information of the optical module readable partition into information of the partition that stores the link negotiation information and that is in the optical module.

Step 204A: Re-obtain the information of the optical module readable partition, and when the partition corresponding to the obtained information of the optical module readable partition is the same as the partition that stores the link negotiation information and that is in the optical module, obtain the optical module link negotiation information.

In the foregoing method, the information of the optical module readable partition is obtained first, and when the partition corresponding to the obtained information of the optical module readable partition is different from the partition that stores the link negotiation information and that is in the optical module, and the recorded quantity of optical module link negotiation information obtaining times does not reach the preset threshold, the information of the optical module readable partition is modified into the information of the partition that stores the link negotiation information and that is in the optical module, to obtain the optical module link negotiation information. This can avoid a situation in which information of an optical module readable partition is first modified into information of a partition that stores link negotiation information and that is in the optical module, and consequently the obtaining fails because transient power interruption, abnormal link reset, or another case occurs during a period after the modification and before reading. Therefore, reliability of reading the optical module link negotiation information is improved.

The foregoing method can be implemented by an MCU. The MCU may be an MCU in a computer device or a server acting as a control device in a storage system, or may be an MCU in a computer device or a server acting as a storage device in a storage system.

Optionally, before step 204A, the method further includes: adding 1 to the recorded quantity of optical module link negotiation information obtaining times.

Optionally, the adding 1 to the recorded quantity of optical module link negotiation information obtaining times can be implemented by adding 1 to a counter in the MCU. For example, the quantity of optical module link negotiation information obtaining times may be recorded by using a first counter in the MCU. After the MCU modifies the information of the optical module readable partition into the information of the partition that stores the link negotiation information and that is in the optical module, 1 is added to the first counter.

Optionally, the preset threshold may be a first preset threshold. The first preset threshold may be 3.

Optionally, after step 204A, the method further includes: when the partition corresponding to the obtained information of the optical module readable partition is different from the partition that stores the link negotiation information and that is in the optical module, and the recorded quantity of optical module link negotiation information obtaining times does not reach the preset threshold, re-modifying the information of the optical module readable partition into the information of the partition that stores the link negotiation information and that is in the optical module, re-obtaining the information of the optical module readable partition, and adding 1 again to the recorded quantity of optical module link negotiation information obtaining times. Specifically, the adding 1 again to the recorded quantity of optical module link negotiation information obtaining times can be implemented by adding 1 to the first counter.

In a possible implementation, the method may further include: terminating obtaining the optical module link negotiation information when the partition corresponding to the obtained information of the optical module readable partition is different from the partition that stores the link negotiation information and that is in the optical module, and the recorded quantity of optical module link negotiation information obtaining times reaches the preset threshold.

A manner of terminating obtaining the optical module link negotiation information may be exiting a driving and management process of the optical module. In this way, an effective processing mechanism is still provided for an optical module that does not support a write operation on a partition selection field, for example, an optical module that does not support writing a page select byte. Therefore, a processing manner used when the optical module does not support a write operation on the partition selection field is provided, and compatibility in reading the optical module link negotiation information is improved.

Optionally, after step 200A, a problem of a link between the MCU and the optical module may lead to a failure in obtaining the information of the optical module readable partition. In this case, the method may further include: determining whether the recorded quantity of optical module link negotiation information obtaining times reaches the preset threshold, and when the recorded quantity of optical module link negotiation information obtaining times does not reach the preset threshold, performing step 200A again, and adding 1 to the recorded quantity of optical module link negotiation information obtaining times. Specifically, after the optical module link negotiation information fails to be obtained, 1 may be added to the first counter as the recorded quantity of optical module link negotiation information obtaining times.

Certainly, some causes for the failure in obtaining the optical module link negotiation information are temporary and can be addressed, but some causes cannot be addressed. To avoid problems such as a dead cycle caused by repeated execution of step 200A after the optical module link negotiation information fails to be obtained, a second counter may be set specific to the failure in obtaining the optical module link negotiation information, to record a quantity of times of obtaining the information of the optical module readable partition. Each time execution of step 200A fails, 1 is added to the second counter once. When a quantity of times recorded by the second counter reaches a preset threshold, for example, a second preset threshold, information about a failure in obtaining the information of the optical module readable partition is sent, and execution of step 200A is stopped. Optionally, the second preset threshold may be 10.

In another implementation, after step 200A, when the information of the optical module readable partition fails to be obtained, no counting needs to be performed, that is, 1 does not need to be added to the second counter, and step 200A can be directly repeated.

Optionally, the optical module link negotiation information is used for link negotiation in the driving and management process of the optical module. The optical module link negotiation information may include a connector type, a photoelectric parameter, multi-mode or single-mode indication information, a voltage, and a transmit offset.

Optionally, the optical module link negotiation information may further include an operating temperature, vendor information, or the like.

Optionally, in the foregoing step 200A, the information of the optical module readable partition may be obtained by obtaining a page select byte control byte of the optical module. The page select byte control byte records information about a selected partition. After a partition is selected, the MCU can read the information of the selected partition. Optionally, the page select byte control byte of the optical module may be the 127th byte in a common memory map.

Figure 4B:
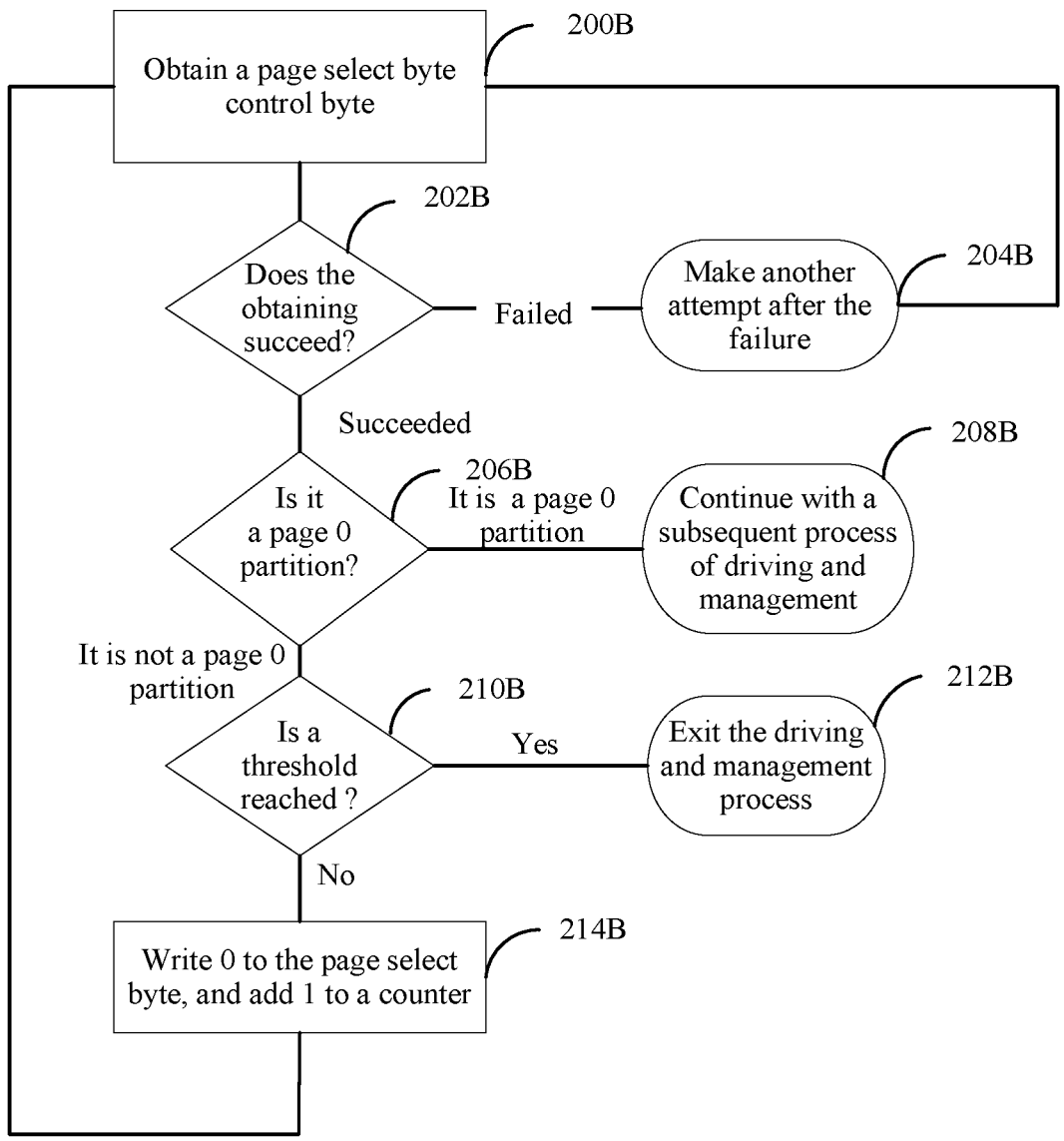
FIG. 4B is a schematic flowchart of a specific optical module link negotiation information obtaining method according to an embodiment.

A mini SAS optical module is used as an example below to describe an optical module link negotiation information obtaining method according to an embodiment. As shown in FIG. 4B, the method includes the following steps.

Step 200B: After detecting access of an optical module, an MCU obtains a page select byte control byte.

The page select byte control byte records information about an optical module readable partition. The optical module includes a page select byte field that can be used to select a partition of the optical module. The page select byte control byte records the information of the readable partition.

For example, when a value recorded by the page select byte control byte is 0, it indicates that information of a page 0 partition can be read. When the value recorded by the page select byte control byte is 3, it indicates that information of a page 3 partition can be read.

In an implementation, the 127th byte in the a common memory map is the page select byte control byte. In other words, the MCU can obtain the information of the readable partition by obtaining content in the 127th byte in the a common memory map.

In this step, when detecting that the optical module accesses a system, the MCU sends, to the optical module by using a communications bus (for example, an I$^2$C bus), an instruction for obtaining the page select byte control byte. This can avoid a situation in which an MCU writes 0 to a page select byte control byte before reading information of a page 0 partition, and consequently the MCU fails to read the information of the page 0 partition because transient power interruption, abnormal reset of master I$^2$C, or another case occurs during a period after 0 is written to the page select byte control byte and before the MCU reads the information of the page 0 partition.

In addition, when the value recorded by the page select byte control byte is 0, it indicates that the readable partition is the page 0 partition. In other words, when the readable partition is the page 0 partition, a step of writing the page select byte field can be skipped performing, thereby improving efficiency in obtaining the optical module link negotiation information.

Step 202B: The MCU determines whether the page select byte control byte is successfully obtained, and when the page select byte control byte is successfully obtained, performs step 206B, when the page select byte control byte fails to be obtained, performs step 204B.

In an example in which the MCU is connected to the optical module by using the I$^2$C bus, the MCU determines, based on a determining criterion on successful obtaining in an I$^2$C communications protocol, whether the page select byte control byte is successfully obtained. The I$^2$C bus includes a clock line and a data line. The MCU receives, by using the data line, content transmitted by the optical module. The received content includes but is not limited to a check bit, an answer signal, data content, and the like. After receiving, by using the data line, the content transmitted by the optical module, the MCU determines, based on the I$^2$C communications protocol, whether the page select byte control byte is successfully obtained.

It should be noted that in this step, the MCU only needs to determine whether the page select byte control byte is successfully obtained, and does not need to determine the obtained content.

Step 204B: The MCU re-attempts to perform step 200B.

In specific implementation, the MCU may fail to obtain the page select byte control byte due to an I$^2$C link fault. In this case, the MCU re-obtains the optical module link negotiation information, that is, performs step 200B again.

In addition, the MCU may add 1 to a recorded quantity of optical module link negotiation information obtaining times. In specific implementation, a count value may be set by using a counter. The count value is 0 by default, and when step 204B is performed for the first time, 1 is added to the counter, and so on. For example, 1 may be added to a first counter in the MCU, to record the quantity of optical module link negotiation information obtaining times.

Optionally, the MCU may alternatively use a second counter to record a quantity of failures in obtaining the optical module link negotiation information. When a value of the second counter reaches a second preset threshold, for example, when the second preset threshold is 10, step 204B is not repeatedly performed, and step 200B is not repeatedly performed, either. In other words, a counter used for the quantity of failures in obtaining the page select byte control byte by the MCU is different from a counter used to count a quantity of times of writing 0 to the page select byte control byte in step 214 B below. In this way, different quantities of execution times can be counted for different situations, and different processing may be performed when different preset thresholds are reached, so that processing precision in obtaining the optical module link negotiation information can be increased.

Optionally, the MCU may further send information about an obtaining failure to a management controller in a computer device or a server in which the MCU is located, such as a baseboard management controller (BMC).

Step 206B: When the MCU successfully obtains the page select byte control byte, the MCU determines whether the value of the obtained page select byte control byte is 0. When the value of the obtained page select byte control byte is 0, it indicates that the page 0 partition has been selected and the information of the page 0 partition can be read. In this case, the MCU performs step 208B. When the value of the obtained page select byte control byte is not 0, it indicates that the page 0 partition has not been selected and the information of the page 0 partition cannot be read. In this case, the MCU performs step 210B.

It should be noted that, the foregoing description is provided by using a case in which the value of the page select byte control byte is 0 as an implementation for selecting the page 0 partition. In specific implementation, another value may also be used as a value, of the page select byte control byte, used for selecting page 0. A specific value representing selection of the page 0 partition is not limited.

Step 208B: The MCU reads the information of the page 0 partition and executes a subsequent driving and management process of the optical module, specific to successful reading of the page 0 partition.

Step 210B: Determine whether the recorded quantity of optical module information obtaining times reaches a preset threshold, and when the preset threshold is exceeded, perform step 212B, when the preset threshold is not exceeded, perform step 214B.

In specific implementation, the quantity of optical module link negotiation information obtaining times may be recorded by using a counter for counting. For example, it may be determined whether the value recorded by the first counter in step 204B exceeds the preset threshold. When the value recorded by the first counter reaches the preset threshold, for example, reaches a first preset threshold, step 212B is performed. When the value recorded by the first counter does not reach the preset threshold, for example, does not reach the first preset threshold, step 214B is performed.

In different cases, a failure in obtaining the optical module link negotiation information is considered as an obtaining attempt and is counted by using a same counter, for example, the first counter, so that when the preset threshold is reached but the optical module link negotiation information still fails to be obtained, no more obtaining attempt is made and the driving and management process is exited. In this way, efficiency in obtaining the optical module link negotiation information can be improved.

When the recorded quantity of optical module information obtaining times reaches the preset threshold, for example, the first preset threshold, it indicates that there is a severe fault and the optical module link negotiation information fails to be obtained. In this case, the optical module link negotiation information is no longer obtained and the driving and management process of the optical module is exited.

Optionally, the first preset threshold is 3. In specific implementation, the first preset threshold may also be flexibly set according to a specific service requirement. For example, the first preset threshold may alternatively be 2, 4, or the like. This embodiment sets no specific limitation thereto.

Step 212B: When the optical module link negotiation information fails to be obtained, exit the driving and management process.

The MCU determines that the information of page 0 fails to be obtained, and exits the driving and management process. In this case, the current driving and management process ends.

Step 214B: The MCU writes 0 to the page select byte control byte to select the page 0 partition, and adds 1 to the recorded quantity of optical module information obtaining times.

Specifically, the MCU may send an instruction to the optical module by using the I²C bus, where the instruction is used to instruct the optical module to write 0 to the page select byte control byte to select the page 0 partition. After the page 0 partition is selected, the MCU can read the information of the page 0 partition.

The adding 1 to the recorded quantity of optical module information obtaining times can be implemented by adding 1 to the first counter used to count the quantity of times in step 204B and step 210B. In this way, efficiency in obtaining the optical module link negotiation information can be improved.

In the method embodiment shown in FIG. 4B, the MCU first obtains content in the page select byte control byte after detecting access of the optical module. When the content in the page select byte control byte is successfully obtained, the MCU then determines whether the selected partition is the page 0 partition. When the selected partition is not the page 0 partition, a value corresponding to the page 0 partition is written to the page select byte control byte, and the content in the page select byte control byte is re-obtained, to re-attempt to obtain the information of the page 0 partition. This can avoid a situation in which the MCU fails to read the information of page 0 due to transient power interruption, abnormal reset of master I²C, or another case. Therefore, reliability in reading the information of the page 0 partition is improved.

Moreover, regardless of whether the MCU successfully writes 0 to the page select byte control byte, the MCU returns to perform step 200B. In this way, for an optical module that supports a write operation on the page select byte control byte, the MCU can obtain the optical module link negotiation information after repeating step 200B, to perform a subsequent driving and management process. For an optical module that does not support a write operation on the page select byte control byte, after step 200B is repeated, when it is determined in step 210B that the preset threshold is reached, the driving and management process of the optical module is ended. In other words, even when the optical module is incompatible, an effective processing mechanism is still provided. Therefore, compatibility in obtaining the optical module link negotiation information is improved.

The foregoing uses the mini SAS optical module as an example for description. Because another optical module, such as an optical module of a network card, an optical module of a fiber channel (FC), and an optical module of a PCIE, has similar driving mechanisms or modes, the solutions provided in the embodiments are also applicable.

Figure 5:
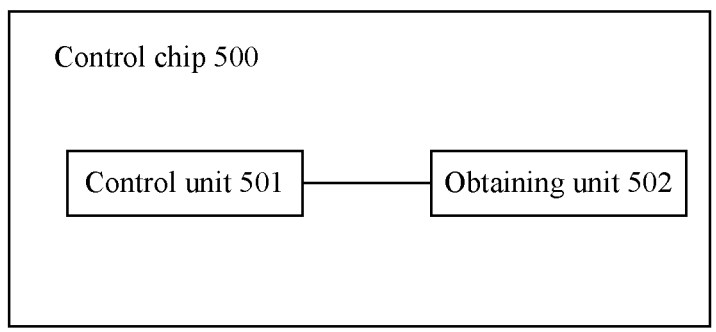
FIG. 5 is a schematic structural diagram of a control chip 500 according to an embodiment.

FIG. 5 is a schematic structural diagram of a control chip 500 according to an embodiment. As shown in FIG. 5, the control chip 500 includes a control unit 501 and an obtaining unit 502.

The obtaining unit 502 is configured to obtain information of an optical module readable partition.

The control unit 501 is configured to: when the partition corresponding to the information of the optical module readable partition that is obtained by the obtaining unit 502 is different from a partition that stores link negotiation information and that is in the optical module, and a recorded quantity of optical module link negotiation information obtaining times does not reach a preset threshold, modify the information of the optical module readable partition into information of the partition that stores the link negotiation information and that is in the optical module.

The obtaining unit 502 is further configured to re-obtain the information of the optical module readable partition, and when the partition corresponding to the obtained information of the optical module readable partition is the same as the partition that stores the link negotiation information and that is in the optical module, obtain the optical module link negotiation information.

The optical module link negotiation information is used for link negotiation in a driving and management process of the optical module.

The optical module link negotiation information includes a connector type, a photoelectric parameter, multi-mode or single-mode indication information, a voltage, and a transmit offset.

Optionally, the optical module link negotiation information further includes an operating temperature, vendor information, or the like.

Figure 6:
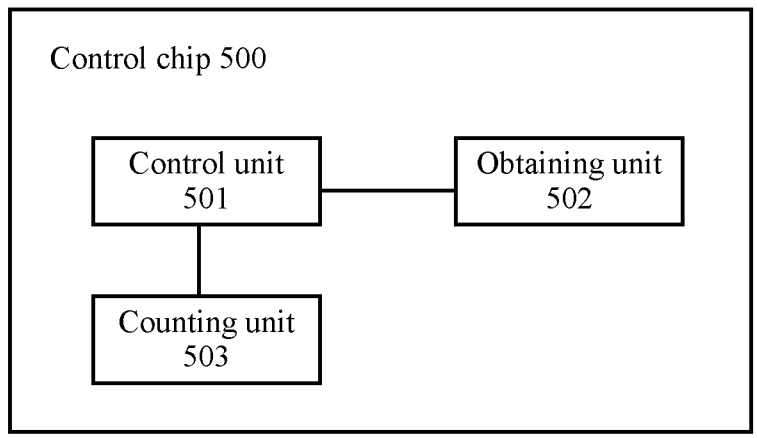
FIG. 6 is a schematic structural diagram of another control chip 500 according to an embodiment.

Optionally, as shown in FIG. 6, the control chip 500 further includes a counting unit 503.

The counting unit 503 is configured to add 1 to the recorded quantity of optical module information obtaining times after the information of the optical module readable partition is modified into the information of the partition that stores the link negotiation information and that is in the optical module.

Optionally, the counting unit 503 is further configured to add 1 to the recorded quantity of optical module link negotiation information obtaining times when the information of the optical module readable partition fails to be obtained and the recorded quantity of optical module link negotiation information obtaining times does not reach the preset threshold.

In a possible implementation, the obtaining unit 502 is further configured to: when the information of the optical module readable partition fails to be obtained, re-obtain the information of the optical module readable partition.

Optionally, a quantity of failures in obtaining the information of the optical module readable partition may be counted by using another counting unit in the control chip 500, for example, a second counting unit (not shown in the figure). When a count of the another counting unit reaches another preset threshold, for example, a second preset threshold, the control chip 500 may exit the driving and management process of the optical module, and send information about a failure in obtaining the information of the optical module readable partition, for example, send the information about the failure in obtaining the information of the optical module readable partition to a BMC of a computer device or a server in which the control chip 500 is located, and the like.

Optionally, the counting unit 503 may be a counter in the control chip 500.

Optionally, the obtaining unit 502 obtains the information of the optical module readable partition by obtaining content corresponding to a page select byte control byte of the optical module, where the page select byte control byte records information of a selected partition.

Optionally, the obtaining unit 502 is further configured to: when the information of the optical module readable partition fails to be obtained and the recorded quantity of optical module link negotiation information obtaining times does not reach the preset threshold, re-obtain the information of the optical module readable partition.

Optionally, the obtaining unit 502 is further configured to terminate obtaining the optical module link negotiation information when the partition corresponding to the information of the optical module readable partition that is obtained by the obtaining unit 502 is different from the partition that stores the link negotiation information and that is in the optical module, and the recorded quantity of optical module link negotiation information obtaining times reaches the preset threshold (for example, a first preset threshold or a second preset threshold).

After the obtaining unit 502 terminates obtaining the optical module link negotiation information, the control chip 500 exits the driving and management process of the optical module.

In the implementation of the control chip 500, the obtaining unit 502 obtains the information of the readable partition, and when the partition corresponding to the information of the readable partition obtained by the obtaining unit 502 is different from the partition that stores link negotiation information and that is in the optical module, and the recorded quantity of optical module link negotiation information obtaining times does not reach the preset threshold, the control unit 501 modifies the information of the optical module readable partition into the information of the partition that stores the link negotiation information and that is in the optical module, to obtain the optical module link negotiation information. This can avoid a situation in which the control chip 500 fails to read the optical module link negotiation information due to transient power interruption, abnormal link reset, or another case. Therefore, reliability in reading the optical module link negotiation information is improved.

In addition, because when the partition corresponding to the obtained information of the readable partition is different from the partition that stores the link negotiation information and that is in the optical module, and the recorded quantity of optical module link negotiation information obtaining times reaches the preset threshold, the obtaining unit 502 in the control chip 500 terminates obtaining the optical module link negotiation information. The control chip 500 can still perform effective processing for an optical module that does not support a write operation on a partition selection field, for example, an optical module that does not support writing the page select byte. Therefore, compatibility in reading the optical module link negotiation information is improved.

Figure 7:
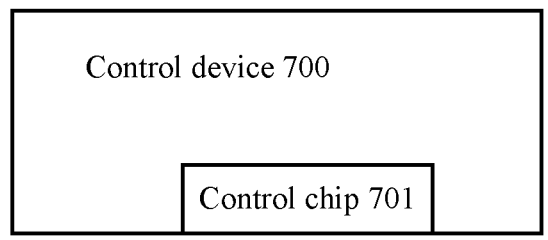
FIG. 7 is a schematic structural diagram of a control device 700 according to an embodiment.

FIG. 7 is a schematic structural diagram of a control device 700 according to an embodiment. As shown in FIG. 7, the control device 700 includes a control chip 701. Specifically, the control device 700 may be a control device in a storage system, and the control device 700 is connected to a storage device in the storage system by using an optical module. When the optical module is connected to the control device 700, the control chip 701 detects access of the optical module and starts a driving and management process of the optical module. Obtaining optical module link negotiation information by the control chip 701 may be implemented with reference to the implementation of the MCU in the method shown in FIG. 4A or FIG. 4B, or may be implemented with reference to the implementation of the control chip 500 shown in FIG. 5 or FIG. 6. Details are not described again.

Figure 8:
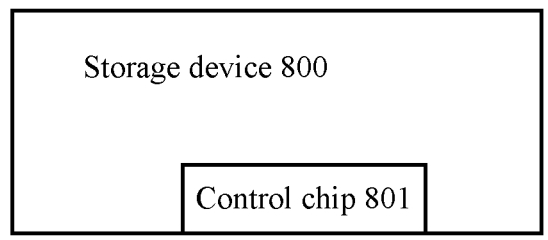
FIG. 8 is a schematic structural diagram of a storage device 800 according to an embodiment.

FIG. 8 is a schematic structural diagram of a storage device 800 according to an embodiment. As shown in FIG. 8, the storage device 800 includes a control chip 801. Specifically, the storage device 800 may be a storage device in a storage system and is connected to a control device or a storage device in the storage system by using an optical module. After the optical module is connected to the storage device 800, the control chip 801 detects access of the optical module and starts a driving and management process of the optical module. Obtaining optical module link negotiation information by the control chip 801 may be implemented with reference to the implementation of the MCU in the method shown in FIG. 4A or FIG. 4B, or may be implemented with reference to the implementation of the control chip 500 shown in FIG. 5 or FIG. 6. Details are not described again.

Figure 9:
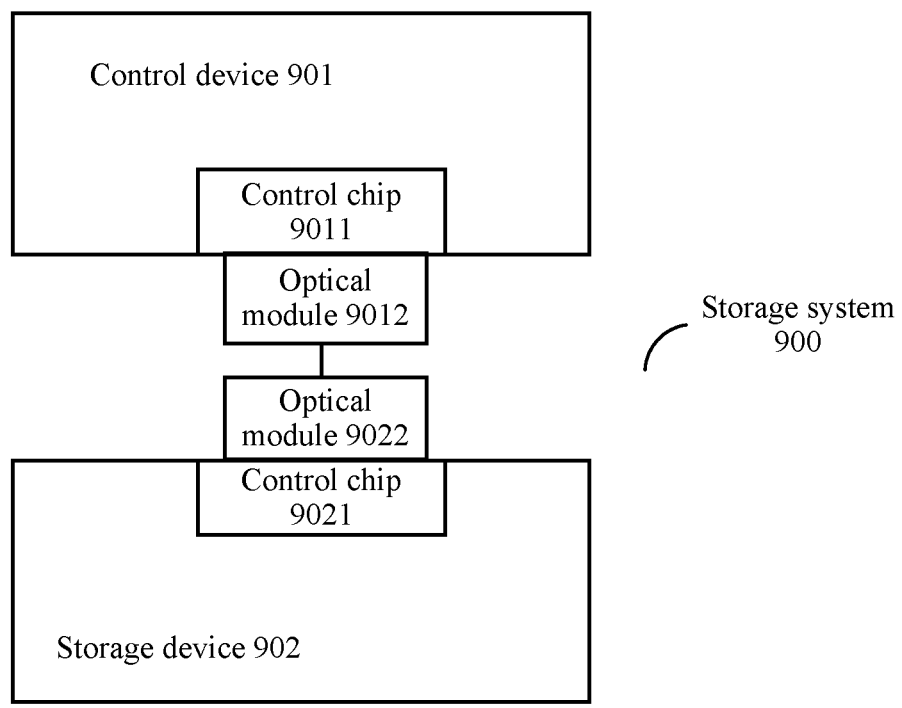
FIG. 9 is a schematic structural diagram of a storage system 900 according to an embodiment.

FIG. 9 is a schematic structural diagram of a storage system 900 according to an embodiment. As shown in FIG. 9, the storage system 900 includes a control device 901 and a storage device 902, where the control device 901 includes a control chip 9011, the storage device 902 includes a control chip 9021, the control device 901 is connected to an optical module 9012, the storage device 902 is connected to an optical module 9022, and the optical module 9012 is connected to the optical module 9022 by using a communications link. For example, the optical module 9012 may be connected to the optical module 9022 by using an SAS link.

When the optical module 9012 is connected to the control device 901, the control chip 9011 detects access of the optical module 9012 and starts a driving and management process of the optical module. Obtaining link negotiation information of the optical module 9012 by the control chip 9011 may be implemented with reference to the implementation of the MCU in the method shown in FIG. 4A or FIG. 4B, or may be implemented with reference to the implementation of the control chip 500 shown in FIG. 5 or FIG. 6. Details are not described again.

When the optical module 9022 is connected to the storage device 902, the control chip 9021 detects access of the optical module 9022 and starts a driving and management process of the optical module. Obtaining optical module link negotiation information by the control chip 9021 may be implemented with reference to the implementation of the MCU in the method shown in FIG. 4A or FIG. 4B, or may be implemented with reference to the implementation of the control chip 500 shown in FIG. 5 or FIG. 6. Details are not described again.

A person of ordinary skill in the art may be aware that, in combination with the examples described in the embodiments disclosed in this specification, units and method steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for a purpose of convenient and brief description, for a detailed implementation of the foregoing device, unit, and system, refer to a corresponding manner in the foregoing method embodiments for implementation. Details are not described herein again.

The disclosed system, device, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments of the present disclosure.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a RAM, a magnetic disk, or a compact disc.

The foregoing descriptions are merely specific implementations of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method comprising:
   obtaining first information of an optical module readable partition, wherein the first information indicates a first partition;
   modifying, when the first partition is different from a second partition that stores link negotiation information in an optical module and when a recorded quantity of optical module link negotiation information obtaining times has not reached a preset threshold, the first information into modified information indicating the second partition to make the second partition an updated optical module readable partition;
   obtaining second information of the updated optical module readable partition; and
   obtaining optical module link negotiation information when the updated optical module readable partition is the same as the second partition.

2. The method of claim 1, further comprising adding 1 to the recorded quantity before obtaining the second information.

3. The method of claim 1, further comprising obtaining, before obtaining the second information, third information of the updated optical module readable partition, wherein the third information indicates the updated optical module readable partition, wherein the updated optical module readable partition is different from the second partition, and wherein the recorded quantity has not reached the preset threshold.

4. The method of claim 1, further comprising skipping obtaining the optical module link negotiation information when the updated optical module readable partition is different from the second partition and when the recorded quantity has reached the preset threshold.

5. The method of claim 1, further comprising:
   attempting to reobtain the first information; and
   adding 1 to the recorded quantity when failing to reobtain the first information and when the recorded quantity has not reached the preset threshold.

6. The method of claim 1, further comprising re-attempting to obtain the first information when failing to obtain the first information.

7. The method of claim 1, wherein the optical module link negotiation information comprises a connector type, a photoelectric parameter, multi-mode indication information or single-mode indication information, a voltage, and a transmit offset.

8. The method of claim 1, further comprising further obtaining the first information by obtaining content corresponding to a page select byte control byte of the optical module.

9. A control device comprising:
an optical module; and
a control chip configured to:
obtain first information of an optical module readable partition, wherein the first information indicates a first partition;
modify, when the first partition is different from a second partition that stores link negotiation information in the optical module and when a recorded quantity of optical module link negotiation information obtaining times has not reached a preset threshold, the first information into modified information indicating the second partition to make the second partition an updated optical module readable partition;
obtain second information of the updated optical module readable partition; and
obtain optical module link negotiation information when the updated optical module readable partition is the same as the second partition.

10. The control device of claim 9, wherein the control chip is further configured to add 1 to the recorded quantity before obtaining the second information.

11. The control device of claim 9, wherein the control chip is further configured to obtain, before obtaining the second information, third information of the updated optical module readable partition, wherein the third information indicates the updated optical module readable partition, wherein the updated optical module readable partition is different from the second partition, and wherein the recorded quantity has not reached the preset threshold.

12. The control device of claim 9, wherein the control chip is further configured to skip obtaining the optical module link negotiation information when the updated optical module readable partition is different from the second partition and when the recorded quantity has reached the preset threshold.

13. The control device of claim 9, wherein the control chip is further configured to:
attempt to re-obtain the first information; and
add 1 to the recorded quantity when failing to reobtain the first information and when the recorded quantity has not reached the preset threshold.

14. The control device of claim 9, wherein the control chip is further configured to: re-obtain the first information of the optical module readable partition when the first information of the optical module readable partition fails to be obtained.

15. The control device of claim 9, wherein the optical module link negotiation information comprises a connector type, a photoelectric parameter, multi-mode indication information or single-mode indication information, a voltage, and a transmit offset.

16. The control device of claim 9, wherein the control chip is further configured to obtain the first information by obtaining content corresponding to a page select byte control byte of the optical module.

17. A storage system comprising:
a storage device; and
a control device configured to:
obtain first information of an optical module readable partition, wherein the first information indicates a first partition;
modify, when the first partition is different from a second partition that stores link negotiation information in an optical module and when a recorded quantity of optical module link negotiation information obtaining times has not reached a preset threshold, the first information into modified information indicating the second partition to make the second partition an updated optical module readable partition;
obtain second information of the updated optical module readable partition; and
obtain optical module link negotiation information when the updated optical module readable partition is the same as the second partition.

18. The storage system of claim 17, wherein the control device is further configured to add 1 to the recorded quantity before obtaining the second information.

19. The storage system of claim 17, wherein the control device is further configured to obtain, before obtaining the second information, third information of the updated optical module readable partition, wherein the third information indicates the updated optical module readable partition, wherein the updated optical module readable partition is different from the second partition, and wherein the recorded quantity has not reached the preset threshold.

20. The storage system of claim 17, wherein the control device is further configured to skip obtaining the optical module link negotiation information when the updated optical module readable partition is different from the second partition and when the recorded quantity has reached the preset threshold.

* * * * *